US008554840B1

(12) United States Patent
Milgramm (10) Patent No.: US 8,554,840 B1
(45) Date of Patent: Oct. 8, 2013

(54) LIVE STREAM DETECTION AND NOTIFICATION SERVICE

(75) Inventor: Michael Milgramm, Valley Stream, NY (US)

(73) Assignee: Veritascope, Inc., Forest Hills, NY (US)

( * ) Notice: Subject to any disclaimer, the term of this patent is extended or adjusted under 35 U.S.C. 154(b) by 0 days.

(21) Appl. No.: 13/570,965

(22) Filed: Aug. 9, 2012

Related U.S. Application Data (60) Provisional application No. 61/610,982, filed on Mar. 14, 2012.

(51) Int. Cl.
*G06F 15/16* (2006.01)

(52) U.S. Cl.
USPC 709/204; 709/203; 348/E5.006; 348/E7.071; 725/46; 725/115; 370/338; 370/401; 715/716

(58) Field of Classification Search
USPC ............ 709/204, 203; 370/401; 725/115, 46; 348/E7.071, E5.006; 715/716
See application file for complete search history.

(56) References Cited

U.S. PATENT DOCUMENTS

| | | | |
|---|---|---|---|
| 6,810,526 B1 * | 10/2004 | Menard et al. | ................. 725/46 |
| 7,356,838 B2 | 4/2008 | Madison et al. | |
| 7,720,686 B2 | 5/2010 | Volk et al. | |
| 7,975,282 B2 | 7/2011 | Deshpande et al. | |
| 8,019,815 B2 * | 9/2011 | Keener et al. | ................. 709/204 |
| 8,082,326 B2 | 12/2011 | Sano | |
| 2006/0112336 A1 * | 5/2006 | Gewickey et al. | ............ 715/716 |
| 2006/0206381 A1 | 9/2006 | Frayman | |
| 2007/0127508 A1 * | 6/2007 | Bahr et al. | ..................... 370/401 |
| 2009/0064253 A1 * | 3/2009 | Oh et al. | ....................... 725/115 |
| 2009/0106397 A1 | 4/2009 | O'Keefe | |
| 2010/0325562 A1 | 12/2010 | Andrews | |
| 2011/0125846 A1 * | 5/2011 | Ham et al. | .................... 709/204 |
| 2011/0218864 A1 | 9/2011 | Pentz et al. | |
| 2011/0222516 A1 * | 9/2011 | Kurose et al. | ................. 370/338 |
| 2012/0131146 A1 | 5/2012 | Choi et al. | |
| 2012/0131621 A1 | 5/2012 | Kanojia et al. | |

OTHER PUBLICATIONS

Roy et al., "A System Architecture for Managing Mobile Streaming Media Services", Proceedings of IEEE Mobile Distributed Computing Workshop, IEEE (2003), pp. 408-413.

Peng et al., "Real-Time Query Processing on Live Videos in Networks of Distributed Cameras", International Journal of Interdisciplinary Telecommunications and Networking, vol. 2 (2010), pp. 27-48.

\* cited by examiner

*Primary Examiner* — Kyung H Shin
(74) *Attorney, Agent, or Firm* — Gary J. Gershik; Cooper & Dunham LLP (57) ABSTRACT

Systems, apparatus and methods are provided to detect live video data satisfying user specified criteria and consolidate live broadcasting management, analysis of detected video data, and notification of potential viewers.

19 Claims, 6 Drawing Sheets

LIVE STREAM DETECTION AND NOTIFICATION SERVICE

This application claims the benefit of U.S. Provisional Application No. 61/610,982, filed Mar. 14, 2012, the contents of which are hereby incorporated by reference in their entirety.

TECHNICAL FIELD

This disclosure relates to tools, such as systems, apparatuses, methodologies, computer program products, etc., for providing a live stream detection and notification service.

BACKGROUND

In the current digital age, more and more live (i.e. real-time) content is being provided on the web, and users are able to read about or spectate events as such events are taking place.

There exist many websites that offer live streaming services, but there is no convenient way to keep track of multiple live streams and to know when any of them goes live, or to be notified when a new live stream that may be of a user's interest becomes available (i.e. goes live) on any of the websites that offer live stream services.

There is a need for a method of providing a notification service that monitors a plurality of streaming service websites and notifies a user when new video data (i.e. a live stream) satisfying certain user-specified criteria becomes available.

SUMMARY

This disclosure provides tools (in the form of apparatuses, methodologies and systems) for allowing users to receive stream notifications on their computers or mobile devices through a web-based live stream detection and notification service provided by a centralized server.

In an aspect of this disclosure, a centralized server detects availability of video data on a plurality of live stream services and notifies a user of the availability of the video data by sending the user a stream notification.

In another aspect of this disclosure, a centralized server for detecting availability of video data on a plurality of live stream services and notifying a user of the availability of the video data, comprises a user registration part for receiving user registration information and user video data preference information, and a control part for detecting the availability of the video data satisfying the user video data preference information on the plurality of live stream services and notifying the user, using the user registration information, of the availability of the video data which satisfies the user video data preference information by outputting a stream notification to a terminal device of the user.

In another aspect of this disclosure, a centralized server for detecting availability of video data on a plurality of live stream services and notifying a user of the availability of the video data, comprises a user registration part for receiving user registration information and user video data preference information, and the user video data preference information comprises at least one of a keyword, a news topic, a name of a reporter or streamer, a geographic region and a group including other users.

In another aspect of this disclosure, a centralized server for detecting availability of video data on a plurality of live stream services and notifying a user of the availability of the video data, comprises a control part which detects the availability of the video data satisfying user video data preference information on the plurality of live stream services, by periodically querying the plurality of live stream services.

In another aspect of this disclosure, a centralized server detects availability of video data on a plurality of live stream services and notifies a user of the availability of the video data satisfying user video data preference information on the plurality of live stream services, by outputting a stream notification, which includes a link to the live stream for which the user is being notified, to the user.

In another aspect of this disclosure, a centralized server detects availability of video data on a plurality of live stream services and notifies a user of the availability of the video data satisfying user video data preference information on the plurality of live stream services, by outputting a stream notification, which includes stream information including a time elapsed since the video data first became available on one of the plurality of live stream services and a number of current viewers streaming the video data.

In another aspect of this disclosure, a centralized server detects availability of video data on a plurality of live stream services and notifies a user of the availability of the video data satisfying user video data preference information on the plurality of live stream services, by outputting a stream notification via e-mail, SMS, mobile application or computer application.

The aforementioned aspects and features allow users to be able to keep track of a plurality of streams on various live stream service websites through a single live stream detection and notification service provider.

BRIEF DESCRIPTION OF THE DRAWINGS

The aforementioned and other aspects, features and advantages can be better understood from the following detailed description with reference to the accompanying drawings wherein.

DETAILED DESCRIPTION

This disclosure provides tools (in the form of apparatuses, methodologies and systems) for allowing users to receive notifications when their favorite streams broadcast on a plurality of streaming websites become available. Such service can be provided through a web-based centralized server via the Internet.

In describing examples and exemplary embodiments illustrated in the drawings, specific terminology is employed for the sake of clarity. However, this disclosure is not intended to be limited to the specific terminology so selected, and it is to be understood that each specific element includes all technical equivalents that operate in a similar manner.

In the present disclosure, the phrase "video data" includes live streams, pictures, and other visual data. The phrases "live stream service website", "live stream service" and "live stream website" are used interchangeably. The phrase "going live" is used to mean video data becoming available for live streaming.

Figure 1:
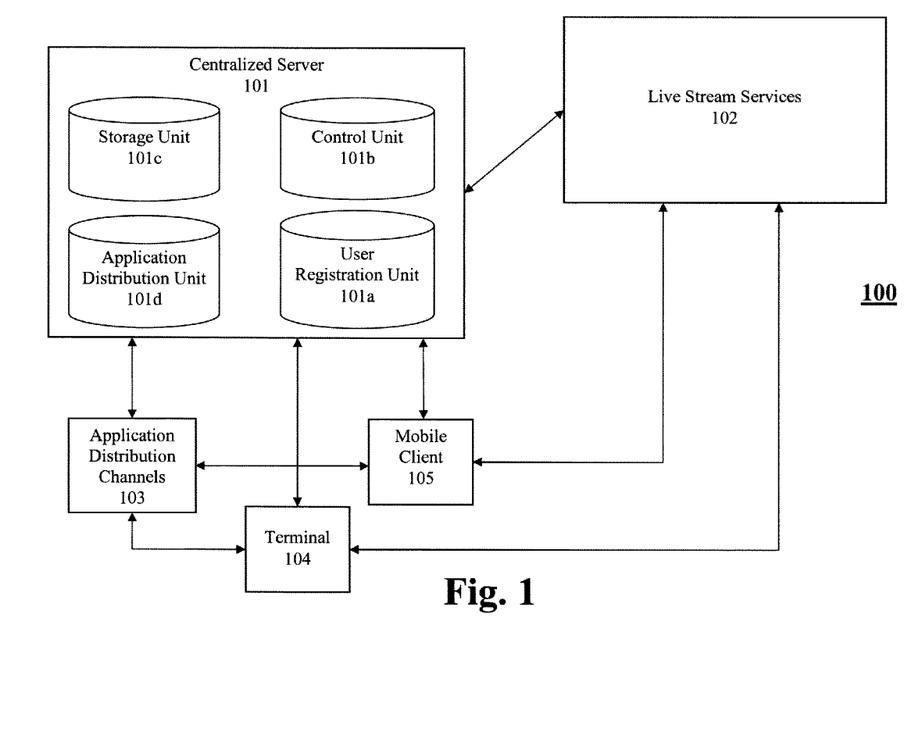
FIG. 1 shows a block diagram of a system, according to an exemplary embodiment.

Referring now to the drawings, wherein like reference numerals designate identical or corresponding parts throughout the several views, FIG. 1 shows a block diagram of a system 100, according to an exemplary embodiment of the present disclosure. The system 100 includes a centralized server 101, live stream services 102, application distribution channels 103, a terminal 104 and a mobile client 105.

The centralized server 101 includes a user registration unit 101a, a control unit 101b, a storage unit 101c and an application distribution unit 101d. The centralized server 101 may be implemented as either hardware (e.g., a notification service providing apparatus) or software (i.e. computer-readable program codes tangibly embodied in a non-transitory medium).

The user registration unit 101a, which is for registering a user, provides a registration user interface for receiving user registration information from the user, and a video data preference user interface for receiving user video data preference information from the user.

For example, when signing up for the live stream detection and notification service provided by the centralized server 101, the user provides user registration information to the centralized server 101. Such user registration information can include basic information about the user such as name, user ID, e-mail address and phone number. The user registration information can later be used to determine the method of notifying the user (e.g., via e-mail or via SMS sent to the phone number).

Alternatively, the user may be allowed to provide a mode of communication and specify the method of receiving stream notifications at a later time (i.e. sometime other than during registration). For example, a registered user can provide a phone number and opt to receive stream notifications via SMS. Or, the user can provide an e-mail address and opt to receive stream notifications via e-mail. A stream notification e-mail would be sent to the e-mail address provided by the user, and the sender e-mail address preferably contains a domain associated with the live stream detection and notification service provider. The user can also opt to receive stream notifications on his or her mobile phone via a stream notification mobile application associated with his or her user ID. The user can even choose to receive stream notifications on his or her desktop, for example, by installing a computer application (e.g., configured to display pop-up notification windows) on the desktop and logging in with his or her user ID. In such cases, the user registration information need not include a separate mode of communication, and can simply include, for example, a user ID and a password.

In addition, the user may also have the option of turning off such stream notification service. For example, the user may be busy and not be able to respond to any stream notifications (e.g. during an important conference call, while driving or sleeping, etc.). In such situation, the user may be allowed to have the live streaming content be collected, spooled, cached, and archived in a content storage on the server side (e.g. the centralized server 101). For example, the archived content may be accessible for viewing (or other user action such as organizing in folders by categories, deleting, downloading to another storage or lawfully re-posting the content elsewhere). The archived content may be in the form of short video clips. However, the form or size of the archived content is not limited to those discussed herein, and may include a wide range of type or form within any specified rules or conditions.

Further, the user provides user video data preference information which specifies a category of video data for which the user wishes to receive stream notifications.

For example, a user can specify that he or she only wants to receive stream notifications of live streams reported by a reporter named "Jane Doe". Whenever new video data by Jane Doe becomes available or one of Jane Doe's existing streams goes live, the user will be sent a stream notification, notifying the user of the availability of the video data, and corresponding details of the video data (such as title, reporter and particular live stream website broadcasting the video data).

The user can also choose, for example, to receive live news coverage of events that take place in South Korea. In that case, whenever new video data about events that take place in South Korea becomes available on a live stream website, a stream notification is sent to the user, notifying the user that a live coverage regarding events in South Korea is available. Such geographic location information provided by the user not only includes country-specific as discussed (i.e. South Korea), but may also specify other geographic preferences such as continent information (e.g. "Europe and Asia"), city information (e.g. "San Diego") or degree of proximity (e.g. "local" coverage of events in neighboring cities).

Also, the user can provide a list of keywords or news topics in which the user is interested and for which the user would like to receive notifications. If the user is interested in watching live coverage of a wildfire in California, the user can upload such keywords, and when the centralized server 101 detects availability of such video data on the live stream services 102, a stream notification will be sent to the user, notifying the user of the availability of such video data.

Also, the user can simply upload a list of his or her favorite streams to the centralized server 101, and choose to receive stream notifications whenever any of his or her favorite streams goes live. For example, if the user is fond of a particular channel run by a streamer (i.e. a person who is filming or reporting the video data) who provides live commentaries sports matches, the user can provide the particular channel to the centralized server 101 and choose to receive stream notifications whenever the channel goes live (i.e. real-time video data is available via the channel).

In addition, the user may specify, during user registration or at a later time, a group of users, and the user can choose to receive stream notifications whenever two or more members of such a group of users are having a teleconference (during which audio, video and/or other data are exchanged) and the teleconference is streamed real-time. For example, the group of users may include friends, family members or co-workers. In an exemplary embodiment, the user may provide a list of groups of which the user may or may not be a member, and the user automatically receives stream notifications for any streamed communication between other members of such groups. The user may also create, join or follow such groups at a later time to receive stream notifications for any streamed communication between other members of the groups. Specifying such group information may or may not require authorization (e.g. the user may have to enter an authorization code before he or she is allowed to follow and receive stream notifications for the streamed activity of the group).

The content of the user video data preference information is flexible, and any combination of criteria (including those not discussed above) can be used to specify the kind of video data that the user is interested in and would like to be notified of.

Even after the user has started watching a particular live stream content, the user may still have the option of spooling or queuing the video data for later viewing (e.g. the user may currently be busy and wish to return to the video at a later time) or otherwise discard the video data (e.g. if the user is not interested in viewing the streamed content or is not satisfied with the quality of the video data). For example, to store or archive the live stream that the user has received a notification for or has started watching, the user may press an appropriate button (e.g. "Store this stream") on his or her mobile device.

The control unit 101b detects availability of video data, located on a plurality of live stream services (i.e. the live stream services 102), which satisfies the user video data preference information provided by the user. The control unit 101b does so by, for example, periodically querying the live stream services 102 (e.g., every 10 seconds). Because the user terminal device (e.g., the terminal device 104 or the mobile client 105) is not doing such repeated sending and receiving of information, the user is able to save system resources of his or her terminal device and performance thereof will not be reduced (e.g., memory/CPU usage or battery life), by using the live stream detection and notification service provided by the centralized server 101.

Alternatively, the live stream detection and notification service provider may enter into an agreement by which the live stream services 102 agree to send push notifications (i.e., transmission of information without any initiation of communication on the part of the receiver) to the centralized server 101 whenever new video data that satisfies the conditions specified by the centralized server 101 becomes available.

Upon detecting the video data available on one of the live stream services, the control unit 101b notifies the user of the availability of the video data by outputting a stream notification to a terminal device of the user (i.e. the terminal 104 and the mobile client 105). The stream notification is preferably pushed onto the terminal device of the user. That is, the user receives a stream notification without first initiating the communication (i.e. requesting the transmission of the stream notification) at the time of receiving the stream notification. The mode of sending the stream notification to the user can take a variety of forms, as discussed above, including, but not limited to, e-mail, SMS and notification via mobile application or computer application.

The storage unit 101c stores, for example, the user registration information and the user video data preference information. The storage unit 101c may include a database which stores data locally on the centralized server 101. Further, the storage unit 101c may also store (either temporarily or permanently) and/or archive the detected video data which satisfies the user video data preference information provided by the user (e.g. received by the user registration unit 101a). For example, if the mobile client 105 is for some reason unavailable at the time the video data satisfying the user video data preference information is detected (e.g. due to failed networking, broken communication links, push notification service limitations or inability to synchronize the centralized server 101 and the mobile client 105), such video data stored in the storage unit 101c (or otherwise archived in a separate database) may be utilized to resolve any problems (e.g. failure to receive stream notification or failure to access the live streams) that may arise due to such unavailability of the mobile client 105.

The application distribution unit 101d communicates with the application distribution channels 103 through which the user can download and install mobile applications (e.g., stream notification mobile application) on a mobile device (i.e. the mobile client 105). In addition, desktop applications may also be downloaded and installed on a desktop of the user (e.g., the terminal 104) from the application distribution channels 103. Such mobile or desktop applications communicate with the centralized server 101 to access the live stream detection and notification service provided by the centralized server 101.

In the example of FIG. 1, the arrows indicate communication via the Internet. That is, the centralized server 101 receives the user registration information via the Internet, communicates with the live stream services 102 to detect the availability of the video data via the Internet, and outputs a stream notification to the user via the Internet. However, such communication is not limited to the Internet and can include other networks such as a local area network, a wide area network or any type of network such as an intranet, an extranet, or a combination thereof.

The live stream services 102 include a plurality of websites that offer streaming services (i.e. relaying video data transmitted by reporters or streamers to users of the websites). For example, they include websites that primarily focus on providing live stream services, such as livestream.com, justin.tv and ustream.tv, and websites that offer live coverage as part of their services, such as CNN, ESPN and NBC. There exist hosts of other websites that offer live stream services.

The application distribution channels 103 include where users can download applications for their mobile devices or desktop computers, including, for example, the Android Market and the App Store. The applications may be available for free or for a price set by the application distribution channels 103 or the developers of the applications.

Figure 3:
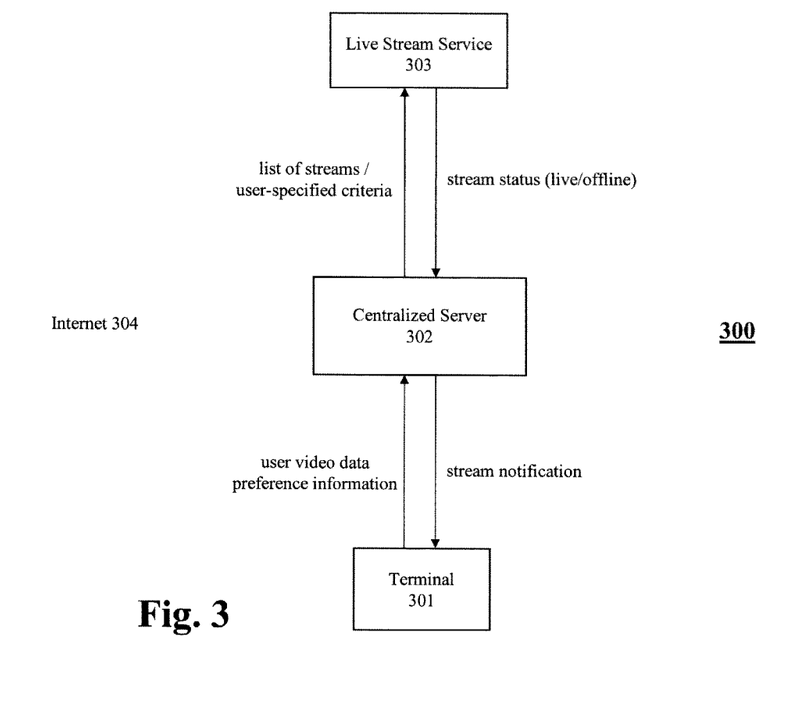
FIG. 3 shows a block diagram of a system, according to another exemplary embodiment.
Figure 4:
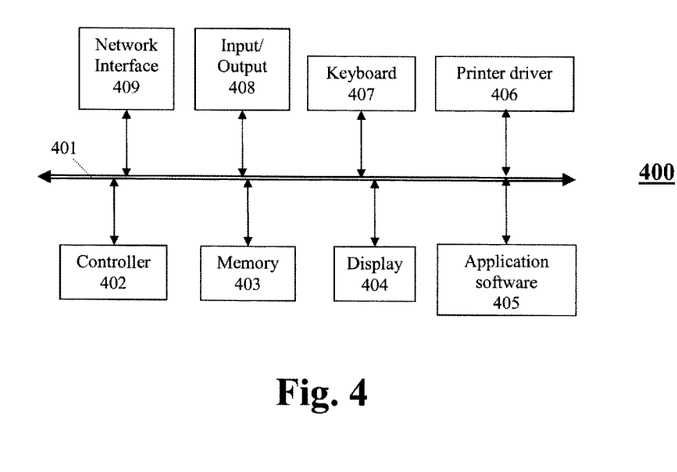
FIG. 4 shows a block diagram of an exemplary configuration of a terminal, such as shown in the system of FIG. 3.

The terminal 104 and mobile client 105 are described further in connection with terminal 301 of FIG. 3, and further with reference to FIG. 4.

With reference to the example of FIG. 2, another configuration of a system for providing a live stream detection and notification service is described below.

Figure 2:
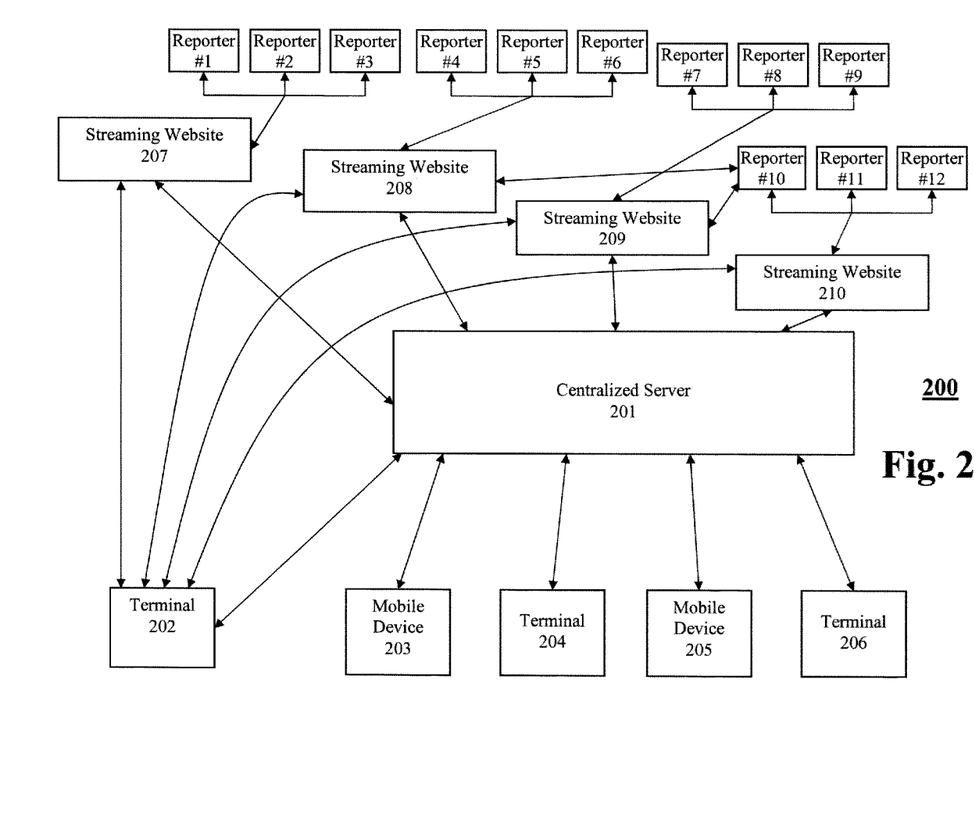
FIG. 2 shows a block diagram of a system, according to another exemplary embodiment.

FIG. 2 shows a system 200 which includes a centralized server 201, terminals 202, 204 and 206, mobile devices 203 and 205, and a plurality of streaming websites 207-210 and a plurality of reporters #1-#12.

Each of the streaming websites 207-210 receives video data from a plurality of reporters and makes such video data available on the streaming website for users. As shown by the terminal 202, users can access such video data by directly logging onto the streaming websites 207-210.

The centralized server 201 communicates with a plurality of streaming websites 207-210 to check if any of the streaming websites 207-210 has any new video data that a specific user is interested in being notified about. Upon detecting availability of such video data, the centralized server 201 notifies the specific user by outputting a stream notification via a terminal device of the specific user (e.g. the mobile device 203).

As shown in FIG. 2, the terminal 202 can directly accesses the content of the streaming websites 207-210. Although not shown in FIG. 2, the mobile devices 203 and 205 and the terminals 204 and 206 can also directly access the streaming websites 207-210. For example, upon receiving a stream notification from the centralized server 210, if the user decides to access the video data corresponding to the stream notification, the user is can directly access the live stream service on which the video data is available.

In the exemplary configuration shown in FIG. 2, the reporter #10 is communicating with streaming websites 208-210, thus resulting in duplicate video data on the three streaming websites 208-210. Preferably, the centralized server 201 is configured to filter such duplicate video data and notify the user only once for each unique video data. In an embodiment of the system 200, the centralized server 201 may include a link to each of the duplicate video data in the stream notification, thereby allowing the user to pick on which of the streaming websites 207-210 he or she would like to access the video data, when the same video data is broadcasted on multiple streaming websites.

Otherwise, the operation of the centralized server 201 is similar to that of the centralized server 101 of FIG. 1.

Some examples of how the systems of FIGS. 1 and 2 can be implemented for providing a live stream detection and notification service are described below with reference to FIGS. 3 through 6.

FIG. 3 shows a block diagram of a system 300 for providing a live stream detection and notification service, in an example of this disclosure. The system 300 includes a terminal 301, a centralized server 302 and a live stream service 303. The centralized server 302 communicates with the terminal 301 and the live stream service 303 via the Internet 304.

The terminal 301 can be any computing device, including but not limited to a personal, notebook or workstation computer, a kiosk, a PDA (personal digital assistant), a mobile phone or handset, another information terminal, etc., that can communicate with other devices via the Internet 304. Although only one user terminal is shown in FIG. 3, it should be understood that the system 300 can include a plurality of user terminal devices (which can have similar or different configurations). The terminal 301 is further described infra with reference to FIG. 4.

Similarly, although only one live stream service is shown in the system 300 of FIG. 3 for illustration purposes, it should be understood that the system 300 can include a plurality of live stream services.

As indicated by the arrow going from the terminal 301 to the centralized server 302, the terminal 301 uploads user video data preference information to the centralized server 302 through a video data preference user interface provided by the centralized server 302.

Upon receiving the video data preference information, the centralized server 302 determines a list of streams (e.g., "ABC News: Weekly Live Report" by "Sarah Miller" on ABCnews.com) based on the video data preference information, and queries the live stream service 303 to check a streaming status (i.e. whether the particular stream is "live" or "offline") of each of the streams on the list. In another exemplary embodiment, user-specified criteria extracted from the video data preference information [e.g., "Sarah Miller" (reporter), "South Korea" (geographic location), "NYC restaurants" (keyword), "Election 2012" (news topic) or "Partners of Smith & Doe LLP" (group of users)] are submitted to the live stream service 303, instead of a list of specific streams.

In response, the live stream service 303 returns the streaming status of each of the streams on the list (or, if submitted user-specified criteria, returns video data satisfying the user-specified criteria submitted). Upon receiving the streaming status of each of the streams on the list, the centralized server 302 sends a stream notification to the terminal 301 for every stream that has a live streaming status (as opposed to an offline streaming status). In the case that user-specified criteria are submitted and video data satisfying such criteria is detected, the centralized server 302 sends a stream notification to the terminal 301 for each video data thus detected. In another exemplary embodiment, the centralized server 302 may execute analytical algorithms on the video data information received from the live stream service 303 to determine which ones of the live streams match the user-specified criteria. Upon determining such live streams the centralized server 302 sends a stream notification to the terminal 301 for each live stream thus detected.

An exemplary configuration of the terminal 301 of FIG. 3 (for example, as a computer) is shown schematically in FIG. 4. In FIG. 4, computer 400 includes a controller (or central processing unit) 402 that communicates with a number of other components, including memory 403, display 404, keyboard (and/or keypad) 407, other input/output (such as mouse, touchpad, stylus, microphone and/or speaker with voice/speech interface and/or recognition software, etc.) 408, network interface 409, print driver 406 and application software 405, by way of an internal bus 401.

The memory 403 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 409 provides a connection (for example, by way of an Ethernet connection or other network connection which supports any desired network protocol such as, but not limited to TCP/IP, IPX, IPX/SPX, or NetBEUI) to network 401.

Print driver 406 and application software 405 are shown as components connected to the internal bus 401, but in practice are typically stored in storage media such as a hard disk or portable media, and/or received through the network 401, and loaded into memory 403 as the need arises.

Depending on the type of the particular terminal device, one or more of the components shown in FIG. 4 may be missing. For example, a particular mobile phone may be missing the print driver 406 and the keyboard 407.

Additional aspects or components of the computer 400 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 5:
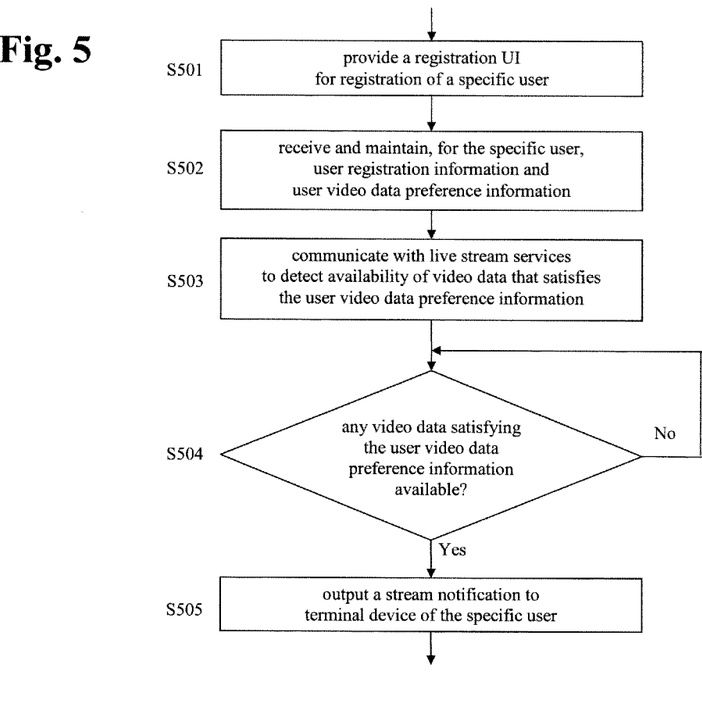
FIG. 5 shows a flowchart for a method of providing a live stream detection and notification service, according to an exemplary embodiment.

With reference to FIG. 5, a method of providing a live stream detection and notification service (utilized by, for example, the centralized server 302 of FIG. 3) is described below.

In the example shown in FIG. 5, the centralized server 302 provides a registration user interface for registration of a specific user (step S501). The centralized server 302 receives, through a registration user interface and a video data preference user interface, user registration information and user video data preference information, and maintains the received information in a database (step S502). Using the received information, the centralized server 302 communicates with a plurality of live stream services to detect availability of video data that satisfies the user video data preference information (step S503). If data received from the plurality of live stream services indicate that video data satisfying the user video data preference information has become available (S504, YES), the centralized server 302 notifies the specific user by outputting a stream notification to the user via a terminal device 301 (step S505).

Figure 6:
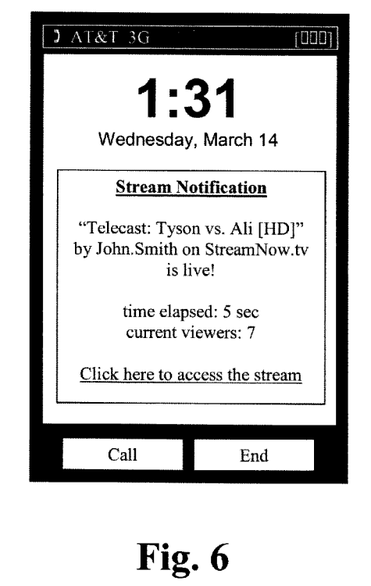
FIG. 6 shows a sample stream notification, according to an exemplary embodiment.

FIG. 6 shows a sample stream notification displayed to the user via a mobile device, according to an exemplary embodiment.

In this example, the stream notification includes the title of the video data available ("Telecast: Tyson vs. Ali [HD]"), the reporter/streamer of the video data ("John.Smith") and the particular live stream service broadcasting the video data ("StreamNow.tv"). Further, the stream notification shows the time elapsed since the video data first became available on the live stream service, and the number of current viewers viewing (i.e. streaming) the video data. The stream notification also provides a link to the video data ("Click here to access the stream") which allows the user to conveniently access the video data.

Some of the advantages of the present disclosure, which are not limited to those provided hereinafter, include:

(1) saved system resources of user terminal devices due to having an external server (i.e. the centralized server 101 of FIG. 1) perform the checking of live stream services;

(2) more efficient transactions due to potential interaction between the live stream detection and notification service provider and the live stream services which allows the live stream services to notify (i.e. send push notifications to) the live stream detection and notification service provider when conditions specified by the live stream detection and notification service provider are met, eliminating the need to constantly query the live stream services;

(3) more efficient transactions due to a centralized live stream detection and notification service, which centrally manages the interaction between live stream producers (i.e. broadcasters, reporters) and live stream consumers (i.e. viewers) by providing reminders or notifications or by posting the producers' schedules at the consolidated web portal (which is accessed by both the broadcasters and the viewers); and (4) ability to monitor multiple stream servers using a single live stream detection and notification service, allowing users to be able to keep track of a plurality of streams on various live stream service websites through a single live stream detection and notification service provider.

The above-mentioned embodiments and examples are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A system for providing a web-based live stream detection and notification service, the system comprising:
a centralized server for (a) detecting availability of video data on a plurality of live stream services configured to relay live streams from reporters to users via the Internet, and (b) notifying a user of the centralized server of the availability of the video data, the centralized server comprising a processor and a non-transitory storage medium embodying instructions executable by the processor to configure the centralized server to include
a user registration part for providing (i) a registration user interface for receiving user registration information from the user and (ii) a video data preference user interface for receiving user video data preference information, and
a control part for (i) detecting the availability of the video data satisfying the user video data preference information on the plurality of live stream services, each one of the plurality of live stream services including one or more reporters who upload the video data to said one of the plurality of live stream services, and (ii) notifying the user of the availability of the video data which satisfies the user video data preference information by outputting a stream notification to a terminal device of the user,
wherein the control part of the centralized server retrieves a personalized set of streams based on the user video data preference information and periodically queries web-based live stream services on which the personalized set of streams are broadcast, to check availability of each one of the streams in the personalized set.

2. The system as claimed in claim 1, wherein the user video data preference information received by the user registration part of the centralized server includes at least one of a name of a reporter's channel, a keyword, a news topic, a name of a reporter or streamer, and a group of users.

3. The system as claimed in claim 2, wherein in a case that the user video data preference information received by the user registration part includes the group of users, the control part detects the availability of the video data which is generated by at least one member of the group of users, and notifies the user of the availability of the video data.

4. The system as claimed in claim 3, wherein the video data is a live stream of a videoconference between two or more members of the group of users, said two or more members generating and uploading portions of the video data.

5. The system as claimed in claim 2, wherein in a case that the user video data preference information received by the user registration part includes the geographic region in which the user is interested, the geographic region identifies a country, and the control part detects the availability of the video data pertaining to the country and notifies the user of the availability of the video data.

6. The system as claimed in claim 1, wherein the terminal device is a mobile device, and the control part of the centralized server communicates with a mobile application on the terminal device to display the stream notification to the user via the terminal device.

7. The system as claimed in claim 1, wherein the control part of the centralized server outputs the stream notification to the user via the Internet.

8. The system as claimed in claim 1, wherein the control part of the centralized server outputs the stream notification to the user via the terminal device without any initiation of communication by the terminal device.

9. The system as claimed in claim 1, wherein the stream notification includes a signal regarding a live stream for which the user is receiving the stream notification.

10. The system as claimed in claim 1, wherein the stream notification displays a time elapsed since a live stream first went live and a number of current stream viewers of the live stream.

11. The system as claimed in claim 1, wherein the centralized server further comprises a storage part for maintaining the user registration information and the user video data preference information, the user registration information including at least one of a user e-mail address, a user phone number and a user ID.

12. The system as claimed in claim 1, wherein the centralized server further comprises an application distribution part for communicating with application distribution channels through which the user downloads and installs mobile applications on the terminal device.

13. The system as claimed in claim 1, wherein
the user registration information includes a user e-mail address associated with the user,
the terminal device is configured to receive e-mails addressed to the user e-mail address associated with the user,
the control part of the centralized server outputs the stream notification to the user e-mail address associated with the user.

14. A method for providing a web-based live stream detection and notification service, comprising:
- providing a registration user interface for registration of a specific user;
- receiving and maintaining, for the specific user, (i) user registration information including information regarding the specific user and (ii) user video data preference information indicating video data preference of the specific user;
- querying periodically a plurality of web-based live stream services to check availability of video data that satisfies the user video data preference information;
- detecting the availability of video data that satisfies the user video data preference information on the plurality of web-based live stream services, each one of the plurality of web-based live stream services including one or more reporters who upload the video data to said one of the plurality of web-based live stream services;
- notifying the user of the availability of the video data that satisfies the user video data preference information by outputting a stream notification to a terminal device of the user.

15. The method as claimed in claim 14, further comprising:
- displaying the stream notification to the specific user through a mobile application on a terminal device of the specific user; and
- communicating with application distribution channels through which the user downloads and installs mobile applications which communicate with a centralized server for providing a web-based live stream detection and notification service.

16. The method as claimed in claim 14, wherein the stream notification is output to the specific user without any initiation of communication by the specific user.

17. The method as claimed in claim 14, further comprising:
- including in the stream notification a link to the video data available on the live stream services, providing direct access to the video data.

18. The method as claimed in claim 14, further comprising:
- including in the stream notification a time elapsed since the video data first became available, and a number of current viewers of the video data.

19. The method as claimed in claim 14, wherein
- the user registration information maintained for the specific user includes a specific e-mail address associated with the specific user, and
- the stream notification is output, via e-mail, to the specific e-mail address associated with the specific user, the specific user receiving the stream notification at a terminal device configured to receive e-mails addressed to the particular address.

* * * * *